UNITED STATES PATENT OFFICE.

MEINHARD HOFFMANN AND CARL KROHN, OF FEEHENHEIM, NEAR FRANKFORT-ON-THE-MAIN, ASSIGNORS TO LEOPOLD CASSELLA & CO., OF FRANKFORT-ON-THE-MAIN, GERMANY.

GRAY AZO DYE.

SPECIFICATION forming part of Letters Patent No. 516,203, dated March 13, 1894.

Application filed June 20, 1892. Serial No. 437,286. (Specimens.) Patented in France November 6, 1889, No. 201,770, and in England April 22, 1891, No. 6,972.

*To all whom it may concern:*

Be it known that we, MEINHARD HOFFMANN and CARL KROHN, subjects of the Emperor of Germany, and residents of Feehenheim, near Frankfort-on-the-Main, Germany, have invented new and useful Improvements in the Production of New Azo Colors, (Gray,) of which the following is a specification.

This invention, for which patents have been taken in Great Britain, No. 6,972, dated April 22, 1891, and in France, additional certificate dated May 15, 1891, to Patent No. 201,770, dated November 6, 1889, relates to the production of new secondary disazo dyestuffs deriving from the amidonaphtholdisulfo acid H, which is described in Patent No. 464,135 of December 1, 1891. We have found that those coloring matters which result from the combination of tetrazo bodies with two molecules of the acid H in presence of alkalies, can be diazotized with one or two molecules of nitrite and that the diazo compounds thus obtained can be further combined with amins or phenols. It is a well known fact that the said process (diazotation of a dyestuff, &c.) can be carried out on the fiber and it will be sufficient to remark that also this manner of producing the new secondary dyestuffs forms part of the present specification.

For the production of the new colors we proceed for instance as follows: Forty-six kilos of the coloring matter deriving from one equivalent of benzidin and two equivalents of acid H, are dissolved in water and seven kilos nitrite are added to the solution, which hereafter is acidulated. The greenish blue diazo compound is brought into the alkaline solution of twelve kilos of metaphenylenediamin. The coloring matter thus obtained is precipitated by common salt, filtered and dried. It dyes unmordanted cotton a fast gray and has the formula:

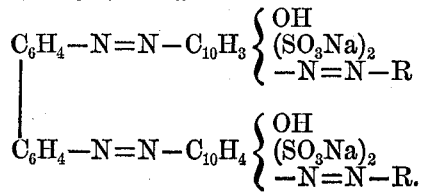

Coloring matters of the same properties are obtained if in the foregoing example the benzidin is replaced by its analogues, such as tolidin, methylbenzidin, diamidoethoxydiphenyle, diamidodiphenolether, diamidoazobenzene, &c. In the place of metaphenylenediamin, naphthols or metatoluylenediamin can be used.

Having now particularly described our invention, what we claim as new, and desire to secure by Letters Patent, is—

1. The process of producing azo colors, consisting of the following steps: The disazo coloring matters which are produced by combining tetrazo bodies with two molecules of amidonaphtholdisulfonic acid H, are brought together with nitrite in an acid solution and the diazo compounds thus obtained are introduced into the solution of phenols or amins in presence of alkalies, substantially as described.

2. The new dyestuff hereinbefore described, being a combination of the dyestuff composed of a tetrazo compound and two molecules of amidonaphtholdisulfonic acid H with naphthol or a metadiamin, forming a blackish gray powder, very easily soluble in water with a gray shade, insoluble in alcohol, dissolving in concentrated sulfuric acid with a blue color, on diluting with water the dyestuff separates from this solution in form of a black precipitate.

In testimony that we claim the foregoing as our invention we have signed our names, in presence of two witnesses, this 4th day of June, 1892.

MEINHARD HOFFMANN.
CARL KROHN.

Witnesses:
ALVESTO S. HOGUE,
JEAN GRUND.